(No Model.)

J. W. OGLE.
MECHANISM FOR SHOCKING CORNSTALKS.

No. 521,088. Patented June 5, 1894.

Witnesses:
Robert Everett
Dennis Sumby

Inventor:
John W. Ogle.
By James L. Norris
Atty.

THE NATIONAL LITHOGRAPHING COMPANY,
WASHINGTON, D. C.

UNITED STATES PATENT OFFICE.

JOHN W. OGLE, OF ARCADIA, ILLINOIS.

MECHANISM FOR SHOCKING CORNSTALKS.

SPECIFICATION forming part of Letters Patent No. 521,088, dated June 5, 1894.

Application filed March 24, 1894. Serial No. 504,948. (No model.)

*To all whom it may concern:*

Be it known that I, JOHN W. OGLE, a citizen of the United States, residing at Arcadia, in the county of Morgan and State of Illinois, have invented new and useful Improvements in Mechanism for Shocking Cornstalks, of which the following is a specification.

My invention relates to mechanism for shocking corn-stalks, or binding them in compact bundles after the corn is husked, or detached, the purpose being to provide a simple and easily operated machine whereby the stalks may be bunched and compressed in tightly packed bundles, or shocks, until properly tied, whereby the shocks may be rolled, or otherwise loaded, upon a cart, or wagon, or may be permitted to lie on the ground, if preferred, until they are wanted.

It is my object to provide means for the purpose specified whereby the shock can be so tightly compacted and bound as to afford a sufficient protection against wind and weather, should it be allowed to lie on its side in the field until used, the bulk of the shock, or bundle, being largely diminished, as compared with those tied by other means.

The invention consists, to these ends, in the several novel features of construction and new combinations of parts hereinafter fully described and then particularly pointed out and defined in the claims which follow this specification.

Figure 1:
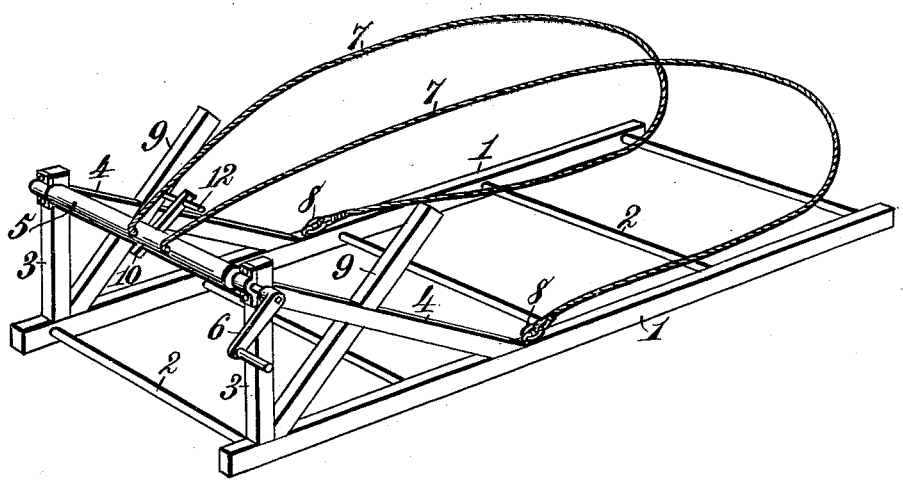
Figure 2:
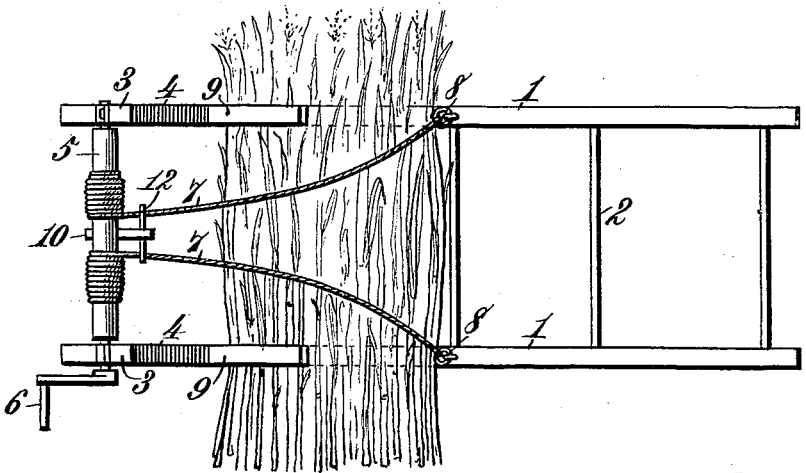

Referring to the drawings which accompany this application for a more complete disclosure of my said invention,—Figure 1 is a perspective view of an apparatus embodying my invention. Fig. 2 is a plan view of the same.

The reference-numeral 1, in said drawings, indicates two parallel side-pieces, or bars, connected by transverse braces, or small beams 2, the whole forming a ladder-shaped frame, or structure, of any suitable length and of a width sufficient to support the stalks and the shock into which they are gathered. At one end of the frame are arranged vertical standards, or posts, 3, rising from the ends of the side-pieces 1, their upper ends being rigidly braced by bars 4, which extend to and unite with said side-pieces at a distance from the standards, or posts 3. In, or upon, the upper ends of the latter is journaled a windlass, or shaft 5, having one of its ends projecting beyond the post and provided with a crank 6, by which it may be turned.

While I have shown in the drawings a crank 6, for turning the shaft 5, I wish it understood that I do not confine myself to this means, as any other suitable device or means may be employed to turn said shaft.

Attached at one end to the windlass or shaft 5, are ropes, or belts, or straps 7, which are of sufficient length to extend to the opposite end of the frame and then, being doubled on themselves, to be carried back toward said windlass until their ends can be attached to rings 8, rigidly connected to the side-bars of the frame at, or near, the ends of the brace-bars 4. The latter derive additional support from bars 9 which rise from the lower ends of the posts 3 and cross the brace-bars 4, rising above the same a suitable distance, said bars 9 being inclined to bisect the right angle between the posts and the side-bars 1, or nearly so.

The operation of the machine is as follows: Being placed upon any suitable vehicle or otherwise transported to the proper point, the stalks, which have been cut and husked, are laid thereon transversely within the loop formed by the two ropes. When a suitable quantity has thus been accumulated the windlass is turned so as to take up the ropes, or straps, thereby drawing the stalks toward the end of the frame and causing the partly-formed bale, or shock, to roll on said frame, by which it is easily caused to assume the required form, after which it is drawn into the angular space between the brace-bars 4 and bars 9, where it is compressed by the strain imposed by the windlass to any desired degree. It is then tied, or bound under such pressure, after which the windlass is released and allowed to pay off the ropes, after which the shock is removed without difficulty.

In order to lock the windlass when the ropes are under tension, I may use any suitable device, such, for example, as a cross-pin 10, passing through the windlass at or near, its center, and provided with a head 12, lying parallel to the windlass, its length being such that it can pass between the ropes 7 near the point of their attachment to the windlass. When under suitable tension a slight displacement of the ropes will cause them to engage the head 12 and this engagement will prevent all rotation until a release is effected.

What I claim is—

1. In a corn-shocker, the combination with a supporting frame of a windlass mounted on posts at one end, ropes connected to said windlass and frame and looped over the latter, brace-bars supporting the posts and bars crossing said brace-bars to form angular spaces to receive the shock when compressed, substantially as described.

2. The combination with a windlass and supporting frame of ropes looped over the latter and connected to it and to the windlass, and a stop consisting of a cross-pin passing through the windlass and having a head parallel to the latter and adapted to pass between the attached ends of the ropes, substantially as described.

In testimony whereof I have hereunto set my hand and affixed my seal in presence of two subscribing witnesses.

JOHN W. OGLE. [L. S.]

Witnesses:
 JOHN J. GOODPASTURE,
 CHAS. A. OGLE.